(12) United States Patent
Knauss

(10) Patent No.: US 6,252,014 B1
(45) Date of Patent: Jun. 26, 2001

(54) STAR POLYMERS AND POLYMERIC PARTICLES IN THE NANOMETER-SIZED RANGE BY STEP GROWTH REACTIONS

(75) Inventor: Daniel M. Knauss, Golden, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 09/366,186

(22) Filed: Aug. 3, 1999

Related U.S. Application Data

(60) Provisional application No. 60/095,304, filed on Aug. 4, 1998.

(51) Int. Cl.[7] .................................................. C08G 77/458

(52) U.S. Cl. ......................... 525/474; 525/452; 525/454; 525/395; 525/440; 528/44

(58) Field of Search ................................... 525/901, 418, 525/461, 452, 436, 440, 454, 395, 474; 528/44

(56) References Cited

U.S. PATENT DOCUMENTS

| 5,393,795 | 2/1995 | Hedstrand et al. ................. 521/134 |
| 5,560,929 | 10/1996 | Hedstrand et al. ................. 424/486 |

OTHER PUBLICATIONS

Young, R.N. and L.J. Fetters, "Star–Branched Polymers. 2. The Reaction of Dienyllithium Chains with the Isomers of Divinylbenzene," *Macromolecules*, vol. 11, No. 5 (Sep.–Oct. 1978), pp. 899–904.

Guo, Andrew et al., "Star Polymers and Nanospheres from Cross–Linkable Diblock Copolymers," *Macromolecules*, vol. 29, No. 7 (1996), pp. 2487–2493.

Shokyoku, Kanaoka et al., "Star–Shaped Polymers by Living Cationic Polymerization. 1. Synthesis of Star–Shaped Polymers of Alkyl Vinyl Ethers," *Macromolecules*, vol. 24, No. 9 (1991), pp. 2309–2313.

Ishizu, Koji and Kenro Sunahara, "Synthesis of star polymers by organized polymerization of macromonomers," *Polymer*, vol. 36, No. 21 (1995), pp. 4155–4157.

Ishizu, Koji and Aysen Onen, "Core–Shell Type Polymer Microspheres Prepared by Domain Fixing of Block Copolymer Films," *J. Polym. Sci.*, Part A: Polymer Chemistry, vol. 27 (1989), pp. 3721–3731.

Ishizu, Koji et al., "Synthesis of Star Polymer with Nucleus of Microgel," *Polymer J.*, vol. 12, No. 6 (1980), pp. 399–404.

Morton, M. et al., "Preparation and Properties of Monodisperse Branched Polystyrene," *J. Polym. Sci.*, vol. 57 (1962), pp. 471–482.

(List continued on next page.)

Primary Examiner—Robert Dawson
Assistant Examiner—Marc S. Zimmer
(74) Attorney, Agent, or Firm—Holme Roberts & Owen LLP; Christopher J. Kulish, Esq.

(57) ABSTRACT

Provided are star-shaped non-vinyl polymers of a variety of compositions and a method for manufacturing such star-shaped polymers. The star-shaped polymers include a plurality of non-vinyl polymeric arms covalently linked to a crosslinked core. The core is made from crosslinkable non-vinyl reactants. The method involves reacting functionalized non-vinyl polymer pre-arms with the crosslinkable non-vinyl reactants.

28 Claims, 3 Drawing Sheets

OTHER PUBLICATIONS

Roovers, Jacques et al., "Regular Star Polymers with 64 and 128 Arms. Models for Polymeric Micelles," *Macromolecules*, vol. 26, No. 16 (1993), pp. 4324–4331.

Saita, Reiko et al., "Synthesis of poly(vinyl alcohol) core–polystyrene shell type microspheres," *Polymer*, vol. 36 No. 23 (1995), pp. 4515–4520.

Ishizu, Koji and Takashi Fucutomi, "Core–Shell Type Polymer Microspheres Prepared from Block Copolymers," *J. Polym. Sci.*, Part C: Polymer Letters, vol. 26 (1988), pp. 281–286.

Knauss et al. "Synthesis and Characterization of Poly(ethylene Oxide) Stars with Crosslinked Polyurethane Core", Polym. Prepr., Am. Chem. Soc., Div Polym. Chem. No. 38(2), (1997), 191–2.*

Allcock et al. "Contemporary Polymer Chemistry", (1990) Prentice Hall, Englewood Cliffs, NJ 07632, p. 128.*

* cited by examiner

MACROMONOMER
PRE-ARM

MACROMONOMER
PRE-ARM (SHORT BLOCK OF FUNCTIONALITY)

STAR POLYMERS AND POLYMERIC PARTICLES IN THE NANOMETER-SIZED RANGE BY STEP GROWTH REACTIONS

CROSS-REFERENCE TO RELATED APPLICATION

This application claims priority under 35 U.S.C. § 119 to prior U.S. Provisional Patent Application No. 60/095,304, filed Aug. 4, 1998, the entire contents of which are incorporated herein as if set forth herein in full.

FIELD OF THE INVENTION

This invention concerns star shaped polymers and polymeric nanoparticles that include non-vinyl polymeric arms and non-vinyl polymeric cores, and a method for making the star shaped polymers and polymeric nanoparticles. In one embodiment, the method involves the reaction of functionalized non-vinyl polymer chains (typically mono-functionalized non-vinyl polymer chains) with crosslinkable non-vinyl monomers to form star polymers or nanoparticles, depending upon the reaction conditions.

BACKGROUND OF THE INVENTION

Star polymers with vinyl polymer arms have been synthesized traditionally by the reaction of an anionic living chain end of the vinyl polymer with a multi-functional compound. Silicon tetrachloride was the first such multi-functional compound to be reacted with living chains to yield a star molecule. Other silyl chloride compounds have been used to form stars with a greater number of arms. The reaction of an anionic living chain end with a divinylic monomer such as divinyl benzene was the next innovation in the synthesis of star polymers. The anionic sites of the living polymer react with the divinylic monomer to form stars with small crosslinked cores. Modification of this synthetic route has been analogously applied to living cationic chains. Both of these syntheses can lead to soluble, star-shaped polymers with highly crosslinked cores. Although the core is crosslinked, the polymer remains soluble due to the solubilizing effect of the arms. This core is also usually considered to be negligible in size relative to the weight fraction of the arms and the core fraction is typically less than five percent of the total weight of the molecule. Materials have also been formed by increasing the weight fraction of the star's core while still obtaining materials that are soluble or colloidally dispersible. For example, a large, calculated amount of divinylbenzene can be added to living polystirene chains, resulting in stars with crosslinked cores of varying weight fraction. It has been found that in this manner stars with crosslinked cores of 30 percent by weight of the total star could be formed while still retaining solubility of the material. Similarly and more recently, living cationic polymerizations were utilized to form stars with polyvinyl polymer arms with crosslinked cores on the order of 35 weight percent. These materials also remained soluble with the large core allowing a large number of arms to fit around it. These multiarm stars showed interesting solution properties due to their architecture. Other syntheses of stars with large, crosslinked cores include synthesizing them from block copolymers where one of the blocks contains crosslinkable functionalities. These block copolymers can form micellar structures in the proper solvent and if the crosslinkable block forms the core of the micelle, the structure of the micelle can be locked in through subsequent crosslinking reactions resulting in star polymers or nanoparticles. This method requires the synthesis of well defined block copolymers by living techniques similar to the requirements of living techniques for other known methods of star formation.

The prior star polymer work involved only vinyl polymers, which severely limits the usefulness of the prior synthesis techniques. This is because vinyl starting materials tend to be expensive and because vinyl polymers are less than ideal for many applications. There is a significant need for techniques to synthesize star polymers of non-vinyl materials and the star polymers that may be made by such techniques.

SUMMARY OF THE INVENTION

With the present invention, it has been found that non-vinyl materials may be used to prepare star-shaped non-vinyl polymers of a great variety of compositions. In one aspect of the invention, a method is provided for making such a star-shaped polymeric material. The method involves reacting functionalized non-vinyl polymer pre-arms with crosslinkable non-vinyl reactants to form a crosslinked core covalently linked to non-vinyl polymeric arms formed from the pre-arms. In a preferred embodiment, the polymeric arms are linked to the core through other than carbon—carbon linkages. These linkages typically are the reaction residue between the functionality of the functionalized non-vinyl polymer pre-arms and the crosslinkable non-vinyl reactants. Some examples of suitable linkages include ester, ether and amide linkages.

In another aspect of the invention, a star-shaped polymeric material is provided, which is manufacturable according to the previously noted method. The star-shaped material includes a polymeric core comprising a crosslinked non-vinyl polymer and a plurality of polymeric arms covalently linked to the core and extending from the core, with the polymeric arms each comprising at least a segment of non-vinyl polymeric material. In one embodiment, the arms impart water solubility or dispersability to the material, even when the core is hydrophobic. Such materials are useful for imbibing organic contaminants for water purification and for trapping hydrophobic drug molecules in the core for sustained drug release. Other uses for the star-shaped materials of the invention, depending upon composition, include toughening agents, size standards, additives for liquid rheology modification, additives for coating materials, and applications when colloidal materials are required. As one example, material with poly(ethylene oxide) arms and a crosslinked polyurethane core may be used for water purification purposes. As another example, material with arms of a nylon polymer and a core of a crosslinked epoxy could be used as a toughening agent. As a further example, material with arms of polyphenylene oxide and a core of a crosslinked polyester could be used as a modifier to reduce brittleness in a bulk phase mixture of polystirene and polyphenylene oxide.

As used herein, crosslinked does not require an infinite network. In that regard, the cores are of finite dimensions, which are highly branched and are formed by linking together a number of crosslinkable monomer units.

DETAILED DESCRIPTION OF THE INVENTION

Figure 1:
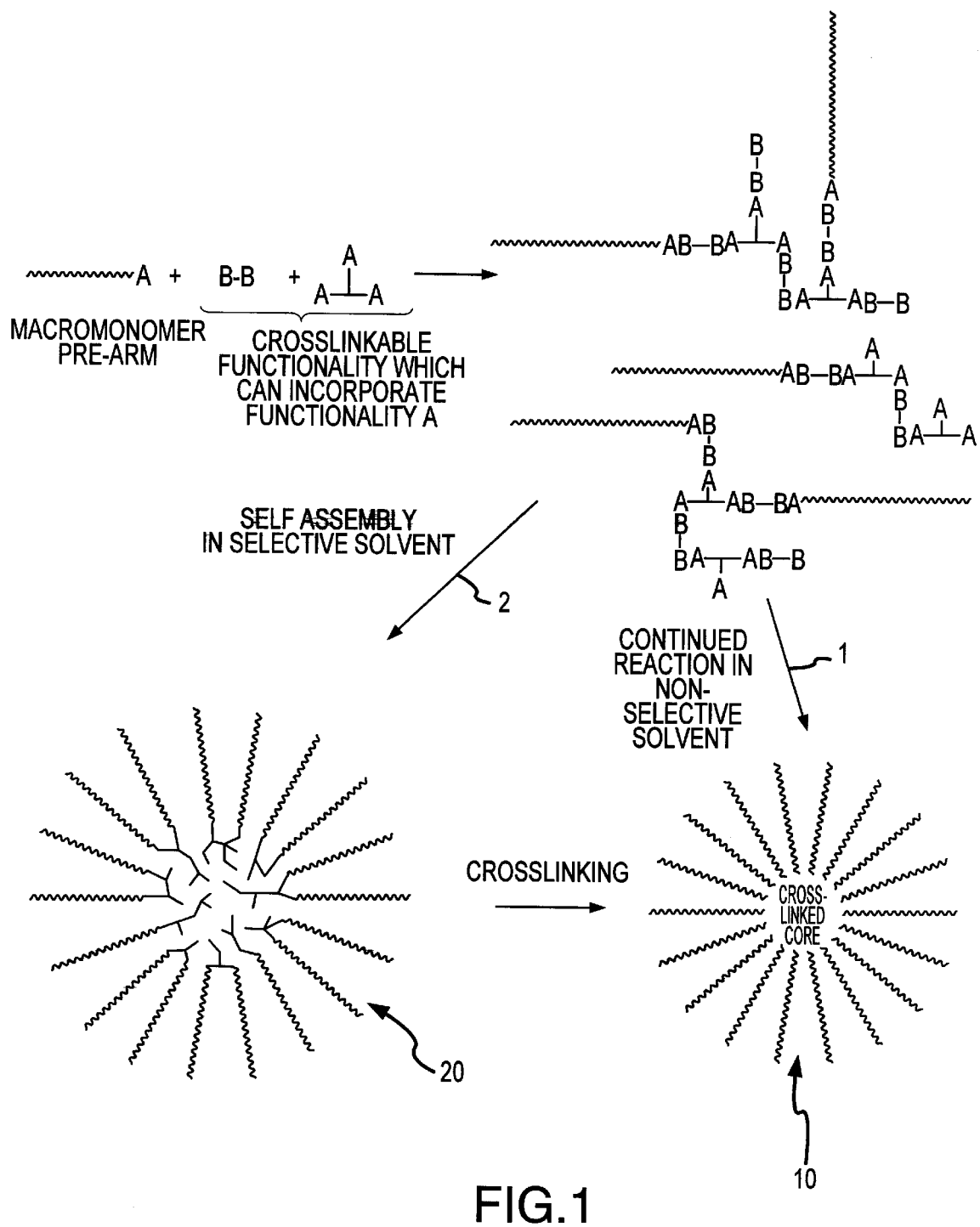
FIG. 1 is a schematic showing two possible reaction paths for making star-shaped materials of the present invention.

The previous methods for star polymer and nanoparticle synthesis have involved vinyl polymers, involving relatively expensive vinyl starting materials and expensive synthesis techniques. With the present invention, star polymers and nanoparticles may be manufactured from relatively inexpensive non-vinyl starting materials, allowing the manufacture of products to be used for a wider variety of applications. Furthermore, star polymers with highly crosslinked cores can be designed to have many of the same attributes of dendritic polymers. The large number of arms possible can result in a high degree of surface functionality, and the amphoteric nature can be controlled by the selection of the arm and core compositions. The entanglement between molecules can be controlled by limiting the molecular weight of the arms, maintaining closely packed arms, and by the resulting high segment density of the core, while the shape and size can be controlled by adjusting the composition and the reaction conditions.

The star-shaped materials of the present invention include a crosslinked polymeric core and non-vinyl polymeric arms extending away from the core. The core typically comprises from about a few weight percent up to about 30 to 40 weight percent or more of the material, depending upon the specific composition. Preferred star-shaped materials include greater than about 5 weight percent of the core material, and more preferably greater than about 10 weight percent of the core material. Materials including greater than about 20 weight percent core, and particularly greater than about 25 weight percent core are particularly preferred for many applications. For most applications, the star-shaped materials will comprise less than about 40 weight percent of the core material, although higher core content may be desired for some applications.

The non-vinyl polymeric arms may comprise a single non-vinyl polymer segment or may include multiple blocks from different non-vinyl monomers. Examples of non-vinyl polymeric materials useful for the arms include, by way of example and without limitation, polyethers, polyesters, polyamides, polysiloxanes, polysulfides, polysulfonates, polysulfonamides, poly(thiol ester)s, polyamines, and the like. Particularly preferred arm compositions are of polyethers, polyesters and polyamides.

A variety of arm compositions can be made through polymerization of AB type monomers or through ring opening reactions. Reaction conditions can be designed to yield polymers functionalized on one end. For AB type polymers, either the A or the B functional group can be utilized for reaction with the crosslinkable reactants. Either the A or the B functional group can be excluded by the use of an appropriate monofunctional reagent. For example, a monoamine can be reacted with ω-amino acid monomer to form a polyamide with an amine end group but no acid end groups. Furthermore, the monoamine reagent could contain a functional group. Other functional groups can also result from subsequent reactions. For example, the alcohol end group of a polyether could be reacted with epichlorohydrin to form an epoxide.

Following is a list of some classes of polymers and specific examples within each class for use in making the arm compositions. Also listed are examples of some functional end groups (listed in parentheses) that may be associated with the non-vinyl polymers for reaction with the core-forming crosslinkable reactants. The list is by way of example only, and is not limiting.

(1) Polyethers:
  (a) poly(alkyl ether)s (alcohol end groups), such as, for example:
    (i) poly(oxirane)s, such as poly(ethylene oxide), poly(propylene oxide) and other substituted poly(oxirane)s, such as poly(ethyl oxirane), poly(t-butyl oxirane) poly(chloromethyl oxirane) and poly(aryloxymethyloxirane)s;
    (ii) poly(oxetane)s, including substituted and unsubstituted poly(oxetane)s, such as poly(3-methyl-3-chloromethyl oxetane) and poly(3,3-bis(chloromethyl oxetane);
    (iii) poly(tetrahydrofuran)s, such as poly(tetrahydrofuran), poly(3-methyltetrahydrofuran), poly(7-oxabicyclo[2.2.1]heptane), and poly(8-oxabicyclo[4.3.0]nonane);
  (b) aromatic polyethers (phenol end groups, haloalkyl end groups), such as, for example:
    (i) poly(phenylene oxide)s, such as unsubstituted poly(phenylene oxide) and poly(2,6-disubstituted phenylene oxide)s, such as poly(2,6-dimethylphenylene oxide);
    (ii) poly(ether sulfone)s from AB type monomers;
    (iii) poly(ether ketone)s from AB type monomers; and
    (iv) other poly(arylene ether)s obtained from AB type monomers;
(2) Polyesters:
  (a) poly(hydroxy acids) (alcohol and/or carboxylic acid end groups, other end groups from the use of monofunctional additives), such as, for example, poly(lactic acid) and poly(glycolic acid);
  (b) polyesters from lactones (alcohol end groups, other end groups from functional initiators), such as, for example, poly(β-propiolactone), poly(β-butyrolactone), poly(α,α-bis(chloromethyl) propiolactone), poly(δ-valerolactone), poly(α,β,γ-trimethoxy-δ-valerolactone), poly(1,4-dioxane-2-one), polyglycolide, polylactide, poly(1,4-dithiane-2,5-dione), poly(trimethylene carbonate), poly(neopentylene carbonate), poly(ethylene oxalate), poly(propylene oxalate), and poly(ε-caprolactone);
  (c) polyesters from copolymerization of cyclic ethers with cyclic anhydrides (alcohol and/or carboxylic acid end groups), such as, for example, polymers from phthalic anhydride and ethylene oxide, methyloxirane, ethyloxirane, phenyloxirane, phenoxymethyl oxirane, and 1,2-epoxycyclohexane; and
  (d) polymers from carbon dioxide and similar oxiranes;
(3) Polyamides:
  (a) polyamides from ω-amino acids (amine and/or carboxylic acid end groups), such as, for example, poly(3-aminopropanoic acid), poly(4-amino butanoic acid), poly(5-aminopentanoic acid), poly (6-aminohexanoic acid), poly(7-aminoheptanoic acid), poly(8-aminooctanoic acid), poly(9-aminononanoic acid), poly(10-aminodecanoic acid), poly(11-aminoundecanoicacid), poly(12-aminododecanoic acid), poly(13-aminotridecanoic acid), poly(3-aminocyclohexanecarboxylic acid), and poly(4-aminocyclohexanecarboxylic acid);
  (b) polyamides from lactams (amine and/or carboxylic acid end groups), such as, for example, poly(β-propiolactam), poly(δ-pyrrolidone), poly(δ-piperidone), poly(ε-caprolactam), poly(ζ-enantholactam), poly(η-caprylolactam), polynonanolactam, polydecanolactam, polyundecanolactam, polydodecanolactam, polytridecanolactam, bicyclic lactams such as poly(2-azabicyclo[2.2.2]octan-3-one), poly(2-azabicyclo[3.3.2]nonan-3-one), poly(2-azabicyclo[3.2.1]octan-3-one), poly(6-azabicyclo[3.2.1]octan-7-one), and poly (2-azabicyclo[3.3.1]nonan-3-one);

(c) polyamides from α-amino acids (amine and/or carboxylic acid end groups), such as, for example, polypeptides; and (d) aromatic polyamides and aromatic aliphatic polyamides from amino acid (AB type) monomers (amine and/or carboxylic acid end groups), such as, for example, poly(4-hydroxybenzoic acid) and poly(4-(aminoalkylphenyl)alkanoic acid)s, such as poly (4-(aminomethylphenyl)methanoic acid;

(4) Polysiloxanes (silanol end groups, other end groups from use of a functionalized initiator or from subsequent reaction), such as, for example, poly(dimethyl siloxane) from ring opening polymerization of the cyclic trimer;

(5) Polysulfides (thiol end groups):

(a) poly(thiirane)s, such as, for example, poly(ethylene sulfide), poly(methyl thiirane), and poly(2,3-dimethyl thiirane); and (b) poly(thietane)s, such as, for example, poly(thietane), and poly(2-methylthietane);

(6) Polysulfonates (thiol end groups), such as, for example, polysulfonates from ring opening of sultones, such as poly(propane sultone);

(7) Polysulfonamides (amine and/or sulfonic acid or sulfate end groups), such as, for example, polysulfonamides from ring opening polymerization of sultams, such as poly (ethanesultam) and polypropanesultam);

(8) Poly(thiol ester)s (thiol and/or carboxylic acid end groups), such as, for example, poly(thiol ester)s from ring opening of thiolactones, such as polythioglycolide, polythiolactide, poly(2,4-dioxo-1,3-dithiane), poly(δ-thiovalerolactone), and poly(ε-thiocaprolactone);

(9) Polyamines (amine end groups):

(a) polyoxazolines, such as, for example, poly(2-substituted oxazoline)s, such as poly(2-ethyl-2-oxazoline) (hydrolysis of pendant acyl group leads to the polyamine);

(b) poly(2-oxazines)s, such as, for example, poly(2-oxazine) and poly(2-substituted-2-oxazine)s, followed by subsequent conversion to polytrimethyleneimine though hydrolysis; and (c) poly(ammonium salts), such as, for example, polymer from the self condensation of (ω)-bromoalkyl) diethylamine.

Copolymers of the above structures can also be made and used for the nonvinyl polymeric arms of the star-shaped materials of the present invention.

Functional end groups result on the end of the AB type polymers or ring-opened polymers. The functional groups can be formed during the polymerization of the arm polymers or the arm polymers can be readily modified after polymerization to yield new functional groups. Furthermore, functionalized initiators can be used in some cases to result in terminal functional groups. Examples of functional groups include the following: alcohol, phenol, thiol, amine, carboxylic acid, carboxylic acid chloride, flouroaryl, chloroaryl, ester, amide, alkoxysilane, chlorosilane, silanol, acetoxysilane, cyano ether, isocyanate, epoxide, and aldehyde.

The core may be any suitable crosslinked non-vinyl polymeric material, including, by way of example and without limitation, polyurethanes, polyureas, polyesters, polyamides, polysilicates, polysiloxanes, polyiminocarbonates, polyphenolformaldehydes, polyamine-formaldehydes, polyurea-formaldehydes, polyamines, polyethers, and the like. Examples of core forming, multi-functional (crosslinkable) non-vinyl reactants with which the functional groups can react, include:

(1) isocyanate and alcohol to form a urethane linkage (can react with alcohol, amine, carboxylic acid, isocyanate, acid chloride, phenol, epoxide, or thiol terminated polymer);

(2) isocyanate and amine to form a urea linkage (can react with alcohol, amine, carboxylic acid, isocyanate, acid chloride, phenol, epoxide, or thiol terminated polymer);

(3) isocyanate and carboxylic acid to form an amide linkage (can react with alcohol, amine, carboxylic acid, isocyanate, acid chloride, phenol, epoxide, or thiol terminated polymer);

(4) isocyanate and thiol to form a thiourethane linkage (can react with alcohol, amine, carboxylic acid, isocyanate, acid chloride, phenol, or epoxide, thiol terminated polymer);

(5) carboxylic acid and amine to form an amide linkage (can react with alcohol, amine, carboxylic acid, isocyanate, acid chloride, phenol, epoxide, or thiol terminated polymer);

(6) carboxylic acid and alcohol or phenol to form an ester linkage (can react with alcohol, amine, carboxylic acid, isocyanate, acid chloride, phenol, epoxide, or thiol terminated polymer);

(7) acid chloride and amine to form an amide linkage (can react with alcohol, amine, carboxylic acid, isocyanate, acid chloride, phenol, epoxide, or thiol terminated polymer);

(8) acid chloride and alcohol or phenol to form an ester linkage (can react with alcohol, amine, carboxylic acid, isocyanate, acid chloride, phenol, epoxide, or thiol terminated polymer);

(9) ester and amine to form an amide linkage (can react with alcohol, amine, carboxylic acid, isocyanate, acid chloride, phenol, epoxide, or thiol terminated polymer);

(10) ester and alcohol or phenol to form an ester linkage (can react with alcohol, amine, carboxylic acid, isocyanate, acid chloride, phenol, epoxide, or thiol terminated polymer);

(11) amide and amine to form an amide linkage (can react with alcohol, amine, carboxylic acid, isocyanate, acid chloride, phenol, epoxide, or thiol terminated polymer);

(12) alkoxysilane with alkoxysilane or silanol to form a silicate (or siloxane) linkage (can react with alkoxysilane, chlorosilane, or silanol terminated polymer);

(13) alkoxysilane with alkoxymetal to form other metal oxide linkages (can react with alkoxysilane, chlorosilane, or silanol terminated polymer);

(14) alkoxysilane with chlorosilane to form a silicate (or siloxane) linkage (can react with alkoxysilane, chlorosilane, or silanol terminated polymer);

(15) chlorosilane with silanol to form a silicate (or siloxane) linkage (can react with alkoxysilane, chlorosilane, or silanol terminated polymer);

(16) silanol with silanol to form a silicate (or siloxane) linkage (can react with alkoxysilane, chlorosilane, or silanol terminated polymer);

(17) alkoxysilane or chlorosilane with water to form a silicate (or siloxane) linkage (can react with alkoxysilane, chlorosilane, or silanol terminated polymer);

(18) acetoxysilane with water to form a silicate (or siloxane) linkage (can react with alkoxysilane, chlorosilane, or silanol terminated polymer);

(19) cyanoether with alcohol to form an iminocarbonate linkage (can react with amine, alcohol, phenol, isocyanate, acid chloride, carboxylic acid, epoxide, or thiol terminated polymer);

(20) phenol and formaldehyde to form a phenol-formaldehyde linkage (can react with aldehyde, phenol, carboxylic acid, epoxide, or acid chloride terminated polymer);

(21) amine and formaldehyde to form an amine-formaldehyde linkage (can react with aldehyde, phenol, alcohol, or amine terminated polymer);

(22) urea and formaldehyde to form a urea-formaldehyde linkage (can react with aldehyde, phenol, alcohol, or amine terminated polymer);

(23) epoxide and amine to form an amine linkage (can react with isocyanate, alcohol, phenol, carboxylic acid, isocyanate, acid chloride, thiol, epoxide, or amine terminated polymer);

(24) epoxide and alcohol or phenol to form an ether linkage (can react with isocyanate, alcohol, phenol, carboxylic acid, isocyanate, acid chloride, thiol, epoxide, or amine terminated polymer);

(25) epoxide and carboxylic acid to form an ester linkage (can react with isocyanate, alcohol, phenol, carboxylic acid, isocyanate, acid chloride, thiol, epoxide, or amine terminated polymer); and

(26) cyclic anhydride and alcohol to form an ester linkage (can react with isocyanate, alcohol, phenol, carboxylic acid, isocyanate, acid chloride, thiol, epoxide, or amine terminated polymer).

Any combination of the above functional groups can be done to achieve multifunctionality. For example in the formation of a crosslinked polyurethane, the isocyanate could be trifunctional and the alcohol difunctional or the isocyanate could be difunctional and the alcohol trifunctional or they could both be trifunctional. Other combinations can also result in crosslinking (e.g., tetrafunctional isocyanate and difunctional alcohol). The crosslinkable monomers could therefore be polymeric in nature. For example, cellulose or starch are common multifunctional alcohols which could be used. In addition, other functional compounds may be reacted with the system to result in residual functional sites.

The star-shaped materials of the present invention may be made in the nanoparticle size range. The nanoparticles may be made to any convenient size through control of manufacture variables. When large particles are preferred, the star-shaped nanoparticles typically have a radius of gyration of larger than about 25 nanometers, more preferably larger than about 50 nanometers, and even more preferably larger than about 100 nanometers.

In one embodiment, the polymeric arms are such that they can effectively maintain dispersion of the cores in nonpolar or polar liquids that are not good solvents for the core, i.e., the core material is substantially not soluble in or swellable by the solvent. Dispersion is maintained due to the soluble nature of the polymeric arms in the solvent. In this embodiment, the cores are often of colloidal size. In one important embodiment, the star-shaped materials are soluble or colloidally dispersible in a polar solvent, and especially in aqueous liquids, even though the core material itself is not soluble in the polar solvent. For example, the polymeric arms could comprise a hydrophilic material, such as polyethylene oxide, and the core could comprise a hydrophobic material, such as a polyurethane. This embodiment is particularly preferred when the star-shaped material comprises greater than about 10 weight percent of the core material, more preferably greater than about 20 weight percent, and most preferably greater than about 25 weight percent of the core material. In this way, the otherwise insoluble core material may be dispersed as discrete uni-molecular domains in the polar solvent, and especially in water as a solvent, due to the hydrophilic nature of the polymeric arms. Solutions and dispersions, and especially aqueous solutions and dispersions, having the star-shaped materials dissolved or dispersed therein are also within the scope of the present invention.

In another embodiment, the star-shaped materials of the present invention are such that they are useful as modifiers, and especially impact modifiers. For example, the polymeric arms may be the same as or soluble in another polymer, with the core being an elastomer, rubber or glass to improve the impact resistance of the composition. The other polymer and the polymeric arms of the star-shaped material of the present invention may be the same polymer, may be mutually soluble polymers, or may have some favorable interactions. Compositions including the star-shaped materials of the present invention as modifiers are within the scope of the present invention.

As one specific example of the use of a star-shaped material of the present invention as a modifier, the star-shaped material could have a core of a crosslinked epoxy and arms of a nylon, such as, for example, nylon 6. The star-shaped material could then be dispersed in a bulk phase of nylon 6, with the epoxy cores acting as a toughening agent for the nylon bulk polymer. As another specific example, the star-shaped material could have a core of a crosslinked polyester and arms of polyphenylene oxide. The star-shaped material could then be dispersed in a bulk phase of a mixture of polystyrene and polyphenylene oxide, to reduce brittleness.

Although specific features of different embodiments of the materials of the present invention have been described, it should be recognized that any feature of one embodiment may be combined in any combination with one or more compatible feature from any other embodiment. For example, any size of core may be used in a material for a modifier or as a dispersed core in a polar or nonpolar liquid, depending upon the particular circumstances. Other uses for the materials are described elsewhere, and any combination of described features may also be used for those other uses of the materials. Furthermore, the arms may be a copolymer of two or more monomers, of a block or random type, or may be a combination of arms of different types. The cores may also be copolymers of two or more monomers.

According to the method of the present invention, a star-shaped polymer or nanoparticle material can be formed by starting with a functionalized non-vinyl polymer and crosslinkable reactants with which the functionalized non-vinyl polymer can react. The crosslinkable reactants from which the cores are formed, are crosslinkable non-vinyl reactants, meaning that at least part of the polymerization/crosslinking reaction sequence to form the core does not involve reaction through a double bond of a vinyl group or another ethylenically unsaturated group. The crosslinkable reactants may, however, include some unsaturated groups that participate to some degree in polymerization/crosslinking reactions to form the core. For example, an unsaturated polyester with maleate or fumarate linkages in the backbone could be used as a crosslinkable reactant. The maleic anhydride could first be attached to preexisting arms, such as arms terminated with alcohol or amine functionality. The unsaturated groups on the arm could then be reacted with those on the unsaturated polyester, such as by heating, to crosslink the polyester to form the final core. Also, the amount of crosslinking could be reduced by reacting some of the unsaturated groups of the unsaturated polyester to reduce the density of available crosslinking sites. For example, some of the potential crosslinking sites could be reacted with stirene monomer and the remaining crosslinking sites could then be reacted to form crosslinks. In this way, excessive brittleness of the composition may be avoided. For most embodiments of the present invention, however, the crosslinkable reactants will be completely non-vinyl crosslinkable reactants, meaning that there will be no unsaturated groups in the reactants to participate in polymerization/crosslinking reactions to form the cores. Accordingly, the invention is described with primary reference to the use of completely non-vinyl crosslinkable reactants for the cores.

It should be recognized that, as used herein, a non-vinyl polymer arm refers to a polymer used for the arms that is not made by polymerization through the double bond of a vinyl group or through the double bond of other ethylenically unsaturated groups. The non-vinyl polymer arms are, rather, the result of such polymerization processes as AB-type condensation polymerization and ring-opening polymerization.

The crosslinkable non-vinyl reactants by themselves would result in a gel. By reacting the functionalized non-vinyl polymer into the mixture, however, protection of the crosslinking functional groups occurs such that no macrogelation occurs. Instead small crosslinked non-vinyl cores form at the interior of a star. Initial reactions first lead to incorporation of the non-vinyl polymer as the arms of small stars. Depending on the solvent used for the reaction, the process can continue through at least two different pathways. These two different pathways are shown in FIG. 1.

In one embodiment of the method of the invention, the solvent is a good solvent for the non-vinyl reactants from which the core is formed and the non-vinyl polymer from which the arms are formed, as well as the non-vinyl polymeric material of the core. In this embodiment, the reaction proceeds by a process of continual star-star coupling reactions of the small stars. As bigger stars develop with a surface covered with non-vinyl polymer arms, the crosslinkable non-vinyl groups at the core of one star become inaccessible to those on the core of another star and growth ceases, resulting in the star-shaped structure 10 as shown in FIG. 1. This embodiment is illustrated by pathway 1 as shown in FIG. 1.

In another embodiment, illustrated as pathway 2 in FIG. 1, the solvent is a good solvent for the non-vinyl polymer for the arms and a poor solvent for the non-vinyl polymeric material of the core. This pathway is preferred for making star-shaped nanoparticles. In this embodiment, both the functionalized polymeric precursor for the arms and the crosslinkable non-vinyl reactants are initially in solution in the solvents. As the non-vinyl reactants polymerize, however, the polymerization product is not soluble in the solvent, with the result that a self assembly of the arms and growing core materials occurs to form micelles with the growing core ends in the core of the micelles and the arms extending outward from the micelle cores into the solvent, as shown in the self-assembled intermediate structure 20 in FIG. 1. This self assembly begins to occur as the crosslinking reaction commences and the growing core material minimizes its solvent interaction. As the crosslinking reaction proceeds, the resulting self-assembled micelle structure is permanently locked in through continued reaction of the non-vinyl crosslinking reactants. The size of the resulting uni-molecular micelle is determined by the size of the original micellar phase of the reactants, which is determined primarily by the weight fraction of the core, the molecular weight of the arms and the concentration of the reactants in the solution.

For both of these pathways, when the growing core reaches a certain size, discrete star-shaped particles are difficult to maintain. Assuming that growth is not limited by the availability of the crosslinkable non-vinyl reactant, materials with cores comprising in the range of from about 30 to about 40 weight percent, relative to the total weight of the star-shaped structure, are obtainable. Above this amount of core, macrogelation often occurs. To promote the manufacture of star-shaped material having an extremely large core content, such as greater than about 40 weight percent, the use of very dilute solutions of the reactants is recommended.

Figure 2:
FIG. 2 is a schematic showing examples of polymeric pre-arms and possible functionalities available for reaction with crosslinkable non-vinyl reactants.
Figure 2:
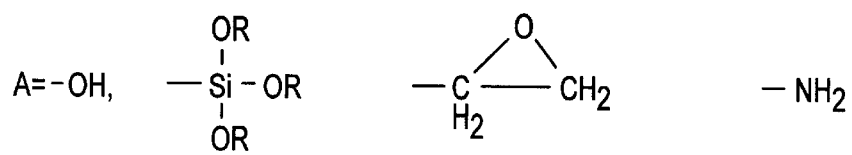
Figure 2:
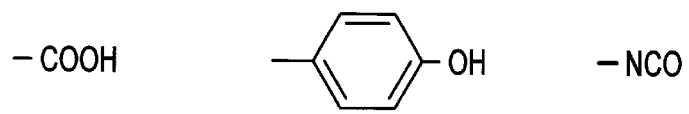

Many different systems can be formed using the synthesis method of the present invention. Non-vinyl polymer for the arms with a variety of functionalities, such as alcohols, phenols, carboxylic acids, amines, oxiranes, siloxy groups and others, can be synthesized while varying the chemical composition of the polymer chain. Many such polymers are available by ring opening polymerizations, the polymerization of A-B type monomers, or the conversion of these to the desired functionality. Examples of non-vinyl polymers for use as the arms include polyesters, polyethers, polyamides, and others, as previously discussed. The functionality can be either a single group or can be a number of functionalities within a short segment on one end of the chain. Alternatively, the functionality can be a single group or a number of functionalities within a short segment located near the middle of the non-vinyl polymer. In this case, the two ends of the non-vinyl polymer extending to either side of the functionality would each form an arm in the final star polymer or nanoparticle. The functionalized non-vinyl polymer for the arms can be reacted with a number of crosslinkable non-vinyl reactants to form crosslinked non-vinyl cores such as, for example, of polyurethanes, polyamides, polyesters, silicates, epoxies, and others, as previously discussed. A variety of materials can be designed by adjusting the composition variables. Examples of some of these are presented in FIG. 2. The solubility of these materials will depend greatly on the solubility of the non-vinyl polymer arm-forming material, and the size will depend on reaction conditions.

The solvent for use in the method of the present invention may be any solvent with adequate solvent properties for the starting materials for the specific composition to be made. For certain systems, the reaction could also be done in the bulk or neat state. Selection of suitable solvents for dissolving any specific functionalized non-vinyl polymer or crosslinkable non-vinyl reactants are within the skill of one of ordinary skill in the art without undue experimentation. Also, a catalyst is frequently used to catalyze the crosslinking reaction to form the core. The catalysts for any specific crosslinking reaction are well known in the art.

Figure 3:
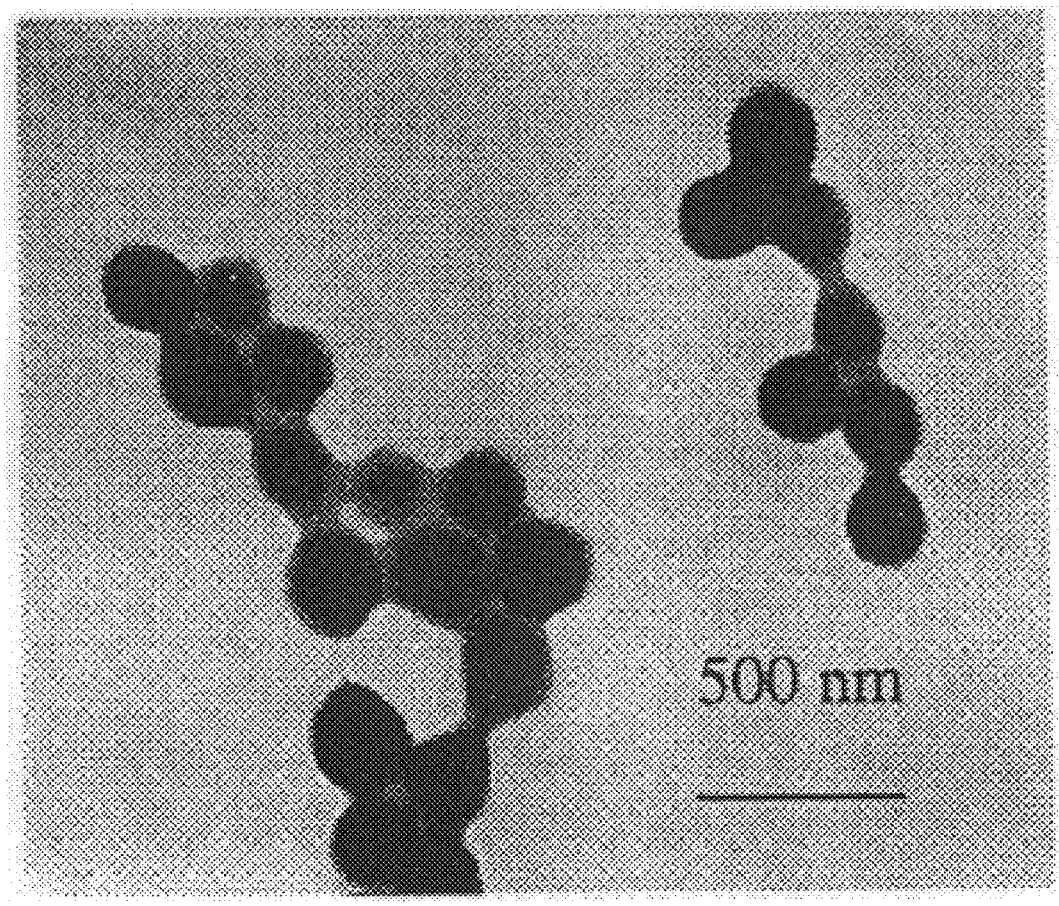
FIG. 3 is a TEM photomicrograph of a 75/25 (by weight) PEO/crosslinked polyurethane star-shaped material of the present invention.

As one specific example of manufacture according to pathway 1, as shown in FIG. 1, one example of synthesis of nano-sized star-shaped materials with poly(ethylene oxide) (PEO) arms and a crosslinked polyurethane core will be discussed, but it should be recognized that the principles discussed apply equally to the synthesis of other compositions. The star-shaped nanoparticles are made by reaction of 5 kdalton poly(ethyene oxide) (PEO) (non-vinyl polymer for the arms), which is functionalized on one end with a monoalcohol and on the other end with a nonreactive functional group (e.g., monomethyl ether as one example) with non-vinyl crosslinkable reactants of a trifunctional alcohol (trimethylolpropane) and a diisocyanate (4,4'-methylene bis(phenylisocyanate), also known as MDI) in a toluene solution selective as a solvent for the PEO. The reaction is catalyzed by a small amount of dibutyltindilaurate. The triol and diisocyanate alone would result in the formation of a crosslinked polyurethane network, but the incorporation of the monofunctionalized PEO results in a self-assembled micellar structure due to the selectivity of the toluene for the PEO. This self-assembled structure is permanently maintained by the subsequent crosslinking reactions. Nano-sized uni-molecular micelles are formed with up to 30 weight percent core, in which the size of the macromolecule increases with the core fraction. Reaction conditions can be varied. One variation is the timing for the addition of trifunctional reagent. Reactions may be conducted by a single addition of the stoichiometric amount (alcohol groups equal to isocyanate groups) (results shown in Table 1) or in separate additions of two portions (results shown in Table 2). Different size materials result depending upon the method of addition, as shown in Tables 1 and 2. Transmission electron microscopy (TEM) of these materials depict the spherical shape and the core-shell morphology. A representative micrograph is shown in FIG. 3, which shows a 75/25 by weight PEO/crosslinked polyurethane material. Also, the materials can be made by using a substoichiometric amount of the crosslinkable non-vinyl reactants when it is desired to decrease the crosslink density. It is important, however, that at least a sufficient amount of the crosslinkable non-vinyl reactants be used to result in a crosslinked core, i.e., a core in which multiple crosslinkable monomer units are linked together.

TABLE 1

Characterization of PEO/Polyurethane Stars in Toluene
Single Addition of Crosslinkable Reactants

| weight % core | dn/dc[1] | $M_w$[2] (g/mole) and $R_g$[3] (nm) | intrinsic viscosity |
|---|---|---|---|
| 2.5 | 0.0643 | 8.36 (+/− 0.9) × $10^4$ 63.6 +/− 3.2 | 0.191 |
| 5 | 0.0710 | 3.00 (+/− 0.4) × $10^5$ 68.4 +/− 7.1 | 0.210 |
| 7.5 | 0.0777 | 3.79 (+/− 0.8) × $10^6$ 78.8 +/− 5.7 | 0.220 |
| 10 | 0.0847 | 2.69 (+/− 0.4) × $10^8$ 106.7 +/− 8.7 | 0.218 |
| 12.5 | 0.0919 | 1.01 (+/− 0.1) × $10^8$ 106.2 +/− 8.5 | 0.240 |
| 15 | 0.0962 | 2.46 (+/− 0.3) × $10^8$ 118.3 +/− 8.4 | 0.219 |
| 17.5 | | | 0.213 |

[1] Measured as slope of refractive index vs. concentration curve.
[2] Weight average molecular weight as determined by multi-angle laser light scattering.
[3] Radius of gyration.

TABLE 2

Characterization of PEO/Polyurethane Stars in Toluene
Double Addition of Crosslinkable Reactants

| weight % core | dn/dc[1] | $M_w$[2] (g/mole) and $R_g$[3] (nm) | intrinsic viscosity |
|---|---|---|---|
| 5 | 0.0727 | 5.03 (+/− 0.4) × $10^4$ 44.0 +/− 4.7 | 0.204 |
| 10 | 0.074 | 4.76 (+/− 0.2) × $10^5$ 49.4 +/− 2.2 | 0.233 |
| 15 | 0.0855 | 2.10 (+/− 0.04) × $10^7$ 80.3 +/− 1.3 | 0.259 |
| 20 | 0.0957 | 6.45 (+/− 0.7) × $10^7$ 100.4 +/− 5.7 | 0.268 |
| 25 | ns | 1.03 (+/− 0.2) × $10^8$ 129.0 +/− 12.8 | ns |
| 5 | 0.0792 | 7.22 (+/− 2.0) × $10^4$ 61.7 +/− 3.9 | 0.233 |
| 10 | 0.0842 | 3.22 (+/− 0.3) × $10^5$ 75.7 +/− 8.7 | 0.234 |
| 15 | 0.0887 | 1.23 (+/− 0.1) × $10^6$ 88.1 +/− 12.5 | 0.216 |
| 20 | 0.101 | 1.87 (+/− 0.3) × $10^8$ 110.7 + 8.8 | 0.245 |
| 25 | 0.112 | 3.51 (+/− 0.3) × $10^8$ 126.8 +/− 5.2 | 0.240 |

As an example of manufacture according to pathway 2, as shown in FIG. 1, some reactants may be reacted in a good solvent for all the reactants, such as THF. All of the reactants and products are soluble in THF, so that a micellar structure does not result, as is the case with toluene as a solvent. Again, the reactions are conducted by adding a stoichiometric amount of the triol all at once (results shown in Table 3) and in two portions (results shown in Table 4). Compared to the use of toluene as a solvent, the materials are much smaller, as shown by the molecular weights presented in Tables 3 and 4.

TABLE 3

Characterization of PEO/Polyurethane Stars in THF
Single Addition of Crosslinkable Reactants

| % core | dn/dc[1] | $M_n$[2] and $M_w$[3] (g/mole) | $M_w/M_n$ | Intrinsic Viscosity |
|---|---|---|---|---|
| 5 | 0.068 | 13280 17810 | 1.34 | 0.161 |
| 10 | 0.072 | 14990 18650 | 1.24 | 0.201 |
| 15 | 0.080 | 16680 23150 | 1.39 | 0.203 |
| 20 | 0.085 | 17550 25210 | 1.44 | 0.196 |
| 25 | 0.089 | 25010 46270 | 1.85 | 0.209 |
| 30 | 0.097 | 34270 77630 | 2.27 | 0.232 |
| 35 | 0.098 | 49170 136100 | 2.77 | 0.242 |

[1] Determined from area under refractive index peak.
[2] Number average molecular weight as determined by gel permeation chromatography and multi-angle laser light scattering detection.
[2] Weight average molecular weight as determined by gel permeation chromatography and multi-angle laser light scaffering detection.

TABLE 4

Characterization of PEO/Polyurethane Stars in THF
Double Addition of Crosslinkable Reactants

| % core | dn/dc | $M_n$ and $M_w$ (g/mole) | $M_w/M_n$ | Intrinsic Viscosity |
|---|---|---|---|---|
| 5 | 0.075 | 15300 17190 | 1.123 | 0.178 |
| 10 | 0.084 | 13480 16670 | 1.237 | 0.193 |

TABLE 4-continued

Characterization of PEO/Polyurethane Stars in THF
Double Addition of Crosslinkable Reactants

| % core | dn/dc | $M_n$ and $M_w$(g/mole) | $M_w/M_n$ | Intrinsic Viscosity |
|---|---|---|---|---|
| 15 | 0.092 | 14730 19960 | 1.337 | 0.229 |
| 20 | 0.098 | 21170 33810 | 1.597 | 0.320 |

The size of the products can be varied by varying the weight percent of core and by the solvent used. Other variations such as reactant concentration, temperature, catalyst, molecular weight of crosslinkable reactants and molecular weight of the arms may have an effect on the size.

For the specific examples described, the resulting structures with crosslinked polyurethane cores and PEO arms have interesting and useful properties. The PEO arms impart water solubility or dispersibility to the structure, thus bringing the crosslinked polyurethane core into aqueous solution. This has many useful applications ranging from water purification to drug delivery. For example, the crosslinked core can be utilized to imbibe organic contaminants from water during water purification. Also, the core can be modified to selectively remove a given contaminant by the incorporation of a specific functionality or binding site within the crosslinked core, or through the incorporation of chain extenders to increase the molecular weight between crosslink points. Drug molecules can also be trapped within the network of the core and can then be slowly released over time into the body of a patient following ingestion, injection or absorption.

Similar results are observed with other compositions, such as when poly(propylene oxide) (PPO) is substituted for PEO, with a polyurethane core.

Materials can also be manufactured by this process for application as toughening agents. It is well known that the toughness of engineering polymers can be improved by the incorporation of phase separated elastomeric or rubber particles. The morphology of these phase separated systems needs to be controlled as only small, well dispersed particles are effective for this purpose. With the present invention, particles of closely controlled size may be made where the core provides the phase separated elastomeric, rubber or glass particle, with the arms maintaining the dispersion of the cores. For example, synthesis of materials with arms from functionalized polyamides and rubbery or glassy cores can be performed, with variables including molecular weight of the polyamide, composition and amount of the core-forming material, and reaction conditions in order to control the phase morphology.

A significant advantage of the materials and method of the present invention is that a wide variety of non-vinyl crosslinking reactants and functionalized non-vinyl polymers are available for use to make the materials. In addition to the uses described above, these materials may also be used as: size standards, additives for liquid rheology modification, additives for toughening applications, additives for coating materials, materials for drug delivery, water purification, and applications where colloidal materials are used.

EXAMPLES

Additional specific examples for manufacture of PEO/polyurethane in toluene and THF systems are as follows:

Materials:

Trimethylol propane and 4,4'-methylene bis(phenyl isocyanate) (MDI) are obtained from Aldrich and fractionally distilled from molecular sieves under reduced pressure. THF and toluene are Fisher HPLC grade. THF is distilled from lithium aluminum hydride. Hexanes are used as received from Fisher. Poly(ethylene glycol) monomethyl ether (PEO) (5,000 g/mole) is obtained from Aldrich and dried at 50° C. under vacuum in the presence of $P_2O_5$ for 24 hrs.

Polymerizations:

Reactions are performed to synthesize star polymers of different weight percent of core. A 1:1 stoichiometry of alcohol groups to isocyanate groups is maintained for all reactions.

Reaction in THF:

The PEO and triol are added to a dried three neck round bottom flask equipped with a magnetic stir bar, condenser, and argon inlet. THF is added and the mixture heated to approximately 50° C. to dissolve the alcohol reactants. Once all reactants are dissolved the MDI is added and the mixture heated to reflux. At reflux two drops of dibutyltin dilaurate is added and the mixture is stirred for 8 hours. At the end of the reaction time, the cooled solution is precipitated into a ten fold excess of hexanes. The polymer powder is isolated by filtration and dried in a vacuum oven overnight at 40° C.

Reaction in Toluene:

PEO is added to a three neck flask equipped with a Dean-Stark trap. Toluene is added and the solution is azeotroped for two hours. The Dean-Stark trap was replaced by a condenser and approximately half of the triol is then added followed by the full amount of MDI. Two drops of dibutyltin dilaurate is added and the solution refluxed for 1 hour. After this time the remaining amount of triol is added and the solution continued to reflux for another 5 hours. Polymer is precipitated into hexanes, filtered and dried overnight in a vacuum oven at 40° C.

Characterization:

Polymers are characterized by intrinsic viscosity using a size 50 Cannon-Ubbelohde viscometer. Molecular weights are determined by either gel permeation chromatography (GPC) coupled with a multi-angle laser light scattering (MALLS) detector or by multi-angle laser light scattering alone. GPC is performed on a Hewlett-Packard Model 1084B liquid chromatograph equipped with a Hewlett-Packard PLgel 5µ Mixed-D column. Elutions are carried out at ambient temperature with THF as solvent at a flow rate of 0.70 ml/min. The MALLS detector is a Wyatt Technology miniDAWN or a Wyatt Technology DAWN DSP. dn/dc for the samples is determined by integration of the refractive index peak of a calibrated RI detector or by determination of the slope in a plot of refractive index vs. concentration. Preliminary dynamic light scattering data is obtained for some samples in water with a Brookhaven Zeta Plus particle analyzer.

Results and Discussion of Examples

PEO star polymers with a crosslinked polyurethane core are synthesized starting with poly(ethylene glycol) monomethyl ether as a pre-arm and trimethylolpropane and MDI as the crosslinked polyurethane precursors. Reactions are done under two different reaction conditions leading to very different materials. In THF as solvent (a good solvent for both the PEO arms and the polyurethane core) the reaction can be envisioned to proceed as according to pathway 2 as shown in FIG. 1. Reaction occurs between species such that block copolymers initially form. These copolymers can then link together as the reaction proceeds to form small stars. Growth of molecular weight continues by star-star coupling through the functionalities within the core of each star. The size of the resulting molecule is determined by the weight fraction of the core which dictates the extent of star-star coupling which can take place. With small weight fractions of core, the size of the molecule can only increase so far before the arms impose too great a steric barrier for further reaction. With greater weight fraction of core, the functionalities within the core are more accessible and star-star coupling can take place to the extent that ultimately each star is crosslinked to several other stars, resulting in gelation. Materials may be synthesized with core sizes up to 30 weight percent. Above this level, gelation occurs when the reaction is conducted at greater than 10 percent (w/v) solids. Samples are found to dissolve readily into water, THF, toluene, and methylene chloride. Characterization of these materials is listed in Table 5. The number average number of arms for these materials was determined by subtracting the weight of the core from the weight of the star determined by light scattering and then dividing the remaining weight due to arms by the molecular weight of an individual arm. The following equation is used for this calculation:

$$N_n = \frac{M_{n,\,star}(1 - \text{weight percent core})}{5000 \text{ g/mole}}$$

When analyzed by GPC, the elution volumes of the stars synthesized in THF are found to be similar, yet the molecular weights determined by light scattering are very different.

Reactions are also conducted in toluene. Toluene is used to azeotropically remove water from the PEO and the reaction system. Reactions are again performed at 10 percent (w/v) solids. The reaction is performed in two stages. In the first stage a deficiency of triol is introduced, calculated such that gelation would not occur at 100 percent reaction. After allowing time for reaction, the remaining amount of triol is introduced and the reaction is taken to completion. Toluene is a good solvent for the PEO arms, but a poor solvent for the polyurethane core material. Therefore in toluene, it is postulated that after reaction has occurred to produce block copolymers the blocks self assemble to form micellar structures with the polyurethane at the core. This can be observed as the reaction mixture scatters light immediately after the catalyst is added. If a sample is removed at this stage and placed in THF, the micelles dissociate and the material forms a miscible solution. After addition of the remainder of the triol, the micellar structures are locked into their conformation through the formation of covalent bonds. For stars of low weight percent core (5 and 10 weight percent) reaction progresses as in THF, that is, no observable scattering occurs from these materials. All materials are found to form micellar solutions in water. Molecular weights and particle sizes are measured for some of the samples synthesized in toluene with results listed in Table 6. Only the low weight percent core materials (5 and 10 weight percent) could be analyzed by GPC-MALLS as the higher percent core materials are not readily eluted from the column. Higher weight percent core materials are analyzed by dynamic light scattering in water with the preliminary results in Table 6.

TABLE 5

Characterization of PEO stars synthesized in THF

| Wt. percent core | $M_n$ (g/mole) | $M_w$ (g/mole) | $M_w/M_n$ | Number average number of arms |
|---|---|---|---|---|
| 15 | 24,600 | 37,000 | 1.50 | 4.2 |
| 20 | 36,300 | 42,700 | 1.18 | 5.8 |
| 25 | 72,300 | 72,700 | 1.01 | 10.9 |
| 30 | 89,900 | 97,290 | 1.08 | 12.6 | molecular weights determined by light scaffering coupled with GPC

TABLE 6

Characterization of PEO stars synthesized in toluene

| Wt. percent core | $M_n$ (g/mole) | $M_w$ (g/mole) | $M_w/M_n$ | Number average number of arms | $D_h{}^1$ |
|---|---|---|---|---|---|
| 5 | 49,900 | 58,300 | 1.17 | 9.5 | |
| 10 | 73,000 | 75,300 | 1.03 | 13.2 | |
| 15 | | | | | 200 |
| 20 | | | | | 250 |
| 25 | | | | | 375 |

[1]hydrodynamic diameter determined in water by DLS

What is claimed is:

1. A star-shaped polymeric material, comprising:
   a polymeric core comprising a cross-linked non-vinyl polymer and a plurality of polymeric arms linked to the core through covalent bonding, with the polymeric arms extending from the core, the polymeric arms each comprising at least a segment of non-vinyl polymeric material.

2. The star-shaped material of claim 1, wherein the polymeric core is linked to the polymeric arms through a linkage that is other than a carbon—carbon linkage.

3. The star-shaped material of claim 2, wherein the linkage is one of an ester linkage, an ether linkage, an amide linkage, and a urea linkage.

4. The method of claim 2, wherein the linkage is a urethane linkage.

5. The star-shaped material of claim 1, wherein the polymeric arms are substantially free of vinyl polymeric material.

6. The star-shaped material of claim 1, wherein the non-vinyl polymeric material of the arms comprises at least a segment of at least one of a polyester, a polyether, a polyamide, a polysiloxane, a polysulfide, a polysulfonate, a polysulfonamide, a poly(thiol ester), and a polyamine.

7. The star-shaped material of claim 1, wherein the polymeric arms are comprised substantially entirely of said non-vinyl polymeric material.

8. The star-shaped material of claim 1, wherein the core is substantially free of vinyl polymeric material.

9. The star-shaped material of claim 1, wherein the core comprises at least one of a polyurethane, a polyamide, a polyester, a silicate, and an epoxy.

10. The star-shaped material of claim 1, wherein the polymeric arms are substantially hydrophilic and the core is substantially hydrophobic.

11. The star-shaped material of claim 1, wherein the polymeric arms comprise at least one of poly(ethylene oxide) and poly(propylene oxide) and the core comprises a crosslinked polyurethane.

12. The star-shaped material of claim 1, wherein the polymeric arms comprise a nylon and the core comprises a crosslinked epoxy.

13. The star-shaped material of claim 1, wherein the polymeric arms comprise polyphenylene oxide.

14. The star-shaped material of claim 1, wherein the polymeric arms comprise at least a segment of an AB condensation polymer.

15. The star-shaped material of claim 1, wherein the polymeric arms comprise a polymer prepared by ring opening polymerization.

16. The star-shaped material of claim 1, wherein the core comprises at least about 20 weight percent of the material.

17. The star-shaped material of claim 1, wherein the core comprises at least about 25 weight percent of the material.

18. The star-shaped material of claim 1, wherein the material comprises unimolecular nanoparticles having a radius of gyration of larger than about 25 nanometers.

19. The star-shaped material of claim 1, wherein the material comprises unimolecular nanoparticles having a radius of gyration of larger than about 50 nanometers.

20. The star-shaped material of claim 1, wherein the material comprises unimolecular nanoparticles having a radius of gyration of larger than about 100 nanometers.

21. A method for making a star-shaped polymeric material, comprising:

provinding at least one functionalized non-vinyl polymer as a precursor for non-vinyl polymeric arms of the star-shaped material;

reacting the functionalized non-vinyl polymer with crosslinkable non-vinyl reactants to form a crosslinked core of reaction product, the core being linked to the non-vinyl polymeric arms through covalent bonding.

22. The method of claim 21, wherein, the core is covalently bonded to the non-vinyl polymeric arms through other than carbon—carbon linkages.

23. The method of claim 22, wherein, the linkages comprise reaction residue between the functionality of the functionalized polymer and the crosslinkable non-vinyl reactants.

24. The method of claim 21, wherein the functionality includes at least one functionality selected from the group consisting of alcohol, phenol, haloalkyl, carboxylic acid, amine, silanol, thiol, sulfonic acid and sulfate.

25. The method of claim 21, wherein the crosslinkable non-vinyl reactants are substantially completely non-vinyl.

26. The method of claim 21, wherein, during the reacting step, the non-vinyl polymer and the crosslinkable non-vinyl reactants are dissolved in a solvent, the solvent being a good solvent for the core formed during the reacting step.

27. The method of claim 21, wherein, during the reacting step, the non-vinyl polymer and the crosslinkable non-vinyl reactants are dissolved in a solvent, the core formed during the reacting step being substantially insoluble in the solvent.

28. The method of claim 27, wherein reactants self assemble into micelles during the reacting step, the micelles comprising growing core ends in micelle cores and the non-vinyl arms extending outward from the micelle cores.

* * * * *